(12) United States Patent
Groepl et al.

(10) Patent No.: US 10,018,736 B2
(45) Date of Patent: Jul. 10, 2018

(54) ONE-STAGE PREAMPLIFIER WITH INTRINSIC PULSE SHAPING

(71) Applicant: Siemens Healthcare GmbH, Erlangen (DE)

(72) Inventors: Martin Groepl, Sonthofen (DE); Edgar Goederer, Forchheim (DE); Thomas Suttorp, Munich (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 15/216,084

(22) Filed: Jul. 21, 2016

(65) Prior Publication Data

US 2017/0038480 A1    Feb. 9, 2017

(30) Foreign Application Priority Data

Aug. 7, 2015   (DE) ........................ 10 2015 215 085

(51) Int. Cl.
*G01J 1/00* (2006.01)
*G01T 1/24* (2006.01)

(52) U.S. Cl.
CPC .................................. *G01T 1/247* (2013.01)

(58) Field of Classification Search
CPC .... G01T 1/17; G01T 7/00; G01T 1/02; G01T 1/161; G01T 1/29
See application file for complete search history.

(56) References Cited

U.S. PATENT DOCUMENTS

| 8,618,471 B2 | 12/2013 | Steadman et al. |
| 2008/0099689 A1* | 5/2008 | Nygard ................. G01T 1/2018 250/370.09 |
| 2009/0237156 A1* | 9/2009 | Griffiths ................ H03F 1/0272 330/86 |
| 2016/0095561 A1* | 4/2016 | Tamura .................. A61B 6/032 378/62 |

OTHER PUBLICATIONS

Cammin et al. "A cascaded model of spectral distortions due to spectral response effects and pulse pileup effects in photon-counting x-ray detector for CT", Medical Physics, vol. 41, No. 4, Apr. 2014, p. 041905-1-041905-15.*
Knoll G.F. "Radiation Detection and Measurement"; 3rd ed.USA; John Wiley & Sons; pp. 610-620; ISBN 0-471-07338-5; 1999.

* cited by examiner

*Primary Examiner* — David Porta
*Assistant Examiner* — Mamadou Faye
(74) *Attorney, Agent, or Firm* — Harness, Dickey & Pierce, P.L.C.

(57) ABSTRACT

A direct-conversion counting x-ray detector includes an analog front end. The analog front end is one-stage. The one stage includes a preamplifier and a pulse shaping unit.

21 Claims, 5 Drawing Sheets

FIG 5 tography is used for many different diagnostic situations. The quality parameters of the computed tomography system, for instance the spectrum of the x-ray radiation, the photon flux, are selected as a function of the examination type or the situation. The inventors have recognized that an additional adjustment or weighing of the energy resolution and the linearity of the x-ray detector is desirable. It is desirable for the measuring system to be optimally attuned to the examination type or situation before the recording takes place. To reduce an unwanted superimposition of individual signals and to achieve an optimal resolution, a switchable pulse shaping is desirable in order to adjust the x-ray detector to the photon flux.

ONE-STAGE PREAMPLIFIER WITH INTRINSIC PULSE SHAPING

PRIORITY STATEMENT

The present application hereby claims priority under 35 U.S.C. § 119 to German patent application number DE 102015215085.2 filed Aug. 7, 2015, the entire contents of which are hereby incorporated herein by reference.

FIELD

At least one embodiment of the invention generally relates to a direct-conversion counting x-ray detector and a medical device.

BACKGROUND

Direct-conversion counting x-ray detectors can be used in x-ray imaging, for instance in computed tomography, angiography or radiography. The x-ray radiation or the photons can be converted into electrical pulses by means of a suitable sensor. CdTe, CZT, CdZnTeSe, CdTeSe, CdMnTe, InP, $TlBr_2$, $HgI_2$, GaAs or other materials can be used as sensor material for instance. The electrical pulses are evaluated by an evaluation electronics system, for instance an integrated circuit (Application Specific Integrated Circuit, ASIC) and are counted if they exceed a defined threshold.

An analog front end and a digital front end are typically disposed in the integrated circuit. In the analog front end the first steps have an amplification of the small input signals and a pulse shaping. In principle it is possible to differentiate between unipolar pulse shaping and bipolar pulse shaping during the pulse shaping. Unipolar pulse shaping can achieve better results in respect of noise and energy resolution. Bipolar pulse shaping is advantageous in the case of high photon fluxes. With high photon fluxes the input signals of the photons occur in rapid sequence, in this way superimpositions of a number of input signals can take place, known as the pileup effect, which may result in a corrupted number of detected events and in corrupted energy information. The use of bipolar pulse shaping can reduce the superimposition of a number of input signals.

The analog front end typically consists of a number of stages, which each perform a single task. The preamplifier is typically designed as a charge amplifier or transimpedance amplifier. In the case of a charge amplifier with capacitative feedback, the charge pulse or the input signal is integrated with the capacitor, causing the voltage at the preamplifier output to change stage by stage. The voltage can be reset using different mechanisms, for instance using a triggered switch, a parallel-connected high-resistance resistor or a controlled current source. A pulse shaper or shaper is arranged downstream of the preamplifier in at least one second stage. The pulse shaper consists of a number of stages. A $CR^M$-$RC^N$ pulse shaper can typically be used. The CR element serves as a high-pass filter. For M=1, it generates a unipolar pulse from the voltage jump, said pulse having a fall time which is defined by the design of the high-pass filter. For M=2, it generates a bipolar pulse from the voltage jump by connecting a second high-pass filter downstream thereof. The further pulse shaping is then used by the RC elements or low-pass filters, in order to achieve an approximation to a Gaussian pulse in the case of a unipolar pulse for instance.

Many different clinical examination types are performed with the aid of computed tomography and computed tomog-

SUMMARY

An embodiment is directed to a direct-conversion counting x-ray detector and/or a medical device, which permits a weighting of photon flux and energy resolution by adjusting the pulse shaping, improving the signal-to-noise ratio and reducing the required surface of the analog front end.

An embodiment of the invention includes a direct-conversion counting x-ray detector and an embodiment of the invention includes a medical device.

An embodiment of the invention relates to a direct-conversion counting x-ray detector which has an analog front end. The analog front end is one-stage and the one stage has a preamplifier and also a pulse shaping unit.

An embodiment of the invention further relates to a medical device, which has an embodiment of an x-ray detector.

BRIEF DESCRIPTION OF THE DRAWINGS

Example embodiments of the invention are explained in more detail below with the aid of drawings, in which.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

An embodiment of the invention relates to a direct-conversion counting x-ray detector which has an analog front end. The analog front end is one-stage and the one stage has a preamplifier and also a pulse shaping unit. The one stage acts here simultaneously as a preamplifier and pulse shaping unit or pulse shaper. The feedback of the one stage simultaneously determines the amplification and the pulse shaping.

In addition to the amplification, the one stage comprises an intrinsic pulse shaping. The analog front end is one-stage and the amplification and pulse shaping of the input signal can thus take place in one stage instead of in a number of stages. Instead of a first stage for amplification and at least one second stage for pulse shaping, in accordance with an embodiment of the invention the amplification and the pulse shaping take place in one stage. As a result, the one stage of the front end fulfills both the task of amplification and also pulse shaping.

The x-ray detector has at least one pixel. In an example embodiment, the x-ray detector has a two-dimensional matrix or arrangement of a plurality of pixels or subpixels. Each pixel or subpixel has the analog front end.

In an example embodiment, the analog front end includes one single stage, which combines the functions of the preamplifier and of pulse shaping. The number of stages in an analog front end of an integrated circuit of a direct-conversion counting x-ray detector can thus be advantageously minimized. At the same time, the required signal processing steps of the amplification of the input signal and the pulse shaping can take place in the one stage.

By using the one stage, it is advantageously possible to achieve an improvement in the signal-to-noise ratio of the x-ray detector particularly during operation of the preamplifier with a low supply voltage. The preamplifier provided within the one single stage can in turn be one-stage or multi-stage.

In an example embodiment, the preamplifier is three-stage. This means that the branch of the preamplifier function can be embodied multi-stage per se, but the function of the preamplifier and of pulse shaping are provided overall in one single stage.

The preamplifier can be operated with a low supply voltage, for instance in the range below 1.5V, so that in the event of high photon fluxes, for instance with photon fluxes of above $10^8*(1/(s*mm^2))$, the preamplifier can be operated in the linear range. Here the amplification has an upper limit so that the preamplifier can be operated in the linear range.

By avoiding further active stages, it is possible to prevent the signal-to-noise ratio from deteriorating. The use of the one stage can advantageously reduce the power loss of the x-ray detector, particularly since a very large number of input signals have to be amplified and shaped in a short period of time in an x-ray detector. The use of the one stage can advantageously reduce the required surface of the analog front end in the integrated circuit. The surface available for the analog and digital front end is limited by the size of the pixels.

By using the one stage, the pixel size of the x-ray detector can be advantageously reduced for instance in order to achieve an improved spatial resolution or a larger surface may be available for other units of the integrated circuit, for instance in the digital front end, in order to perform further evaluation steps within the x-ray detector and the data flow to external evaluation units can thus be reduced.

An embodiment of the invention further relates to a medical device, which has an embodiment of an x-ray detector.

Advantages of an example embodiment of the inventive x-ray detector can be transferred to an example embodiment of the medical device. The ability to switch between the unipolar pulse shaping and the bipolar pulse shaping allows the pulse shaping to be adjusted the photon flux for instance. The influence of superimposed signals, known as pile-up, with high photon fluxes can thus be advantageously reduced and improved imaging properties of the medical device can thus be advantageously achieved. Moreover, by using the one stage, the surface required for the analog front end can be reduced, so that smaller pixels or other analog or digital processing steps can be performed in the integrated circuit. An improved spatial or energy resolution can be advantageously achieved in the imaging using the medical device. Moreover, the signal-to-noise ratio can be advantageously reduced and a reduced dose per recording or an improved diagnosis with the medical device are enabled.

According to one example embodiment of the inventive x-ray detector, the one stage has a feedback path. The one stage is a feedback amplifier stage.

The one stage has a preamplifier and a feedback network with the feedback path. The downstream connection of a number of stages is circumvented with the aid of the feedback network and the flexibility in respect of the embodiment of the pulse shaping is advantageously increased.

According to one example embodiment of the inventive x-ray detector, the feedback path has a first impedance $Z_{Feedback}$. An amplification of the input signal and a pulse shaping is dependent on the first impedance $Z_{Feedback}$.

The first impedance $Z_{Feedback}$ lies between the amplifier input and the amplifier output. The first impedance $Z_{Feedback}$, known as the direct feedback impedance, of the one stage is selected in the feedback path such that both an amplification of the input signal and also a pulse shaping are performed. With the aid of the first impedance $Z_{Feedback}$, the pulse can be advantageously shaped within the one stage, namely as a function of the first impedance $Z_{Feedback}$ selected. Unipolar pulse shaping can advantageously take place, which is particularly suited to low photon fluxes and enables an improved energy resolution of the x-ray detector.

According to one example embodiment of the inventive x-ray detector, the one stage has a capacitor with a parallel-connected resistor.

The feedback amplifier stage can carry out both an amplification and also a pulse shaping of the input signal by using a capacitor with a parallel-connected resistor. The one stage advantageously has the function of amplification and pulse shaping.

According to one example embodiment of the inventive x-ray detector, the parallel-connected resistor is low-resistance.

The parallel-connected resistor of the resistive branch of the preamplifier is designed to be low-resistance in comparison with the capacitative branch. Low-resistance here means in particular that the low-resistance parallel-connected resistor enables short pulse shaping times in the range of less than 50 ns, in particular less than 30 ns and preferably less than 20 ns. The resistive branch is highly conductive. The parallel-connected resistor can be configured between 100 kΩ and 900 kΩ, wherein the capacitative branch can have a capacitance of 10 fF to 20 fF. A sufficiently rapid discharge process of the capacitor can be achieved by the low-resistance resistor. Advantageously a unipolar pulse can thus be generated.

According to one example embodiment of the inventive x-ray detector, the stage has a path between the first impedance $Z_{Feedback}$ and a ground or a supply voltage. The path has a second impedance $Z_{Bipolar}$.

The path has a final impedance. In addition to the first impedance $Z_{Feedback}$, the one stage can have a second impedance $Z_{Bipolar}$. The second impedance $Z_{Bipolar}$ can be in the feedback network. The second impedance $Z_{Bipolar}$ can go from a suitably selected tapping point of the first impedance $Z_{Feedback}$ to the ground or supply voltage. A capacitive part enables a high-pass characteristic to be added to the transfer function of the amplifier. The one stage can thus advantageously have a bipolar pulse shaping.

According to one example embodiment of the inventive x-ray detector, the path has a switch. The switch is configured to activate or deactivate the path.

The second impedance $Z_{Bipolar}$ can be connected. With the aid of the switch, the path with the second impedance $Z_{Bipolar}$ can, advantageously, be rapidly and easily activated or deactivated. The switch can be arranged here between the second impedance $Z_{Bipolar}$ and the ground or the supply voltage. Alternatively, the switch can be arranged between the suitably selected tapping point of the first impedance $Z_{Feedback}$ and the second impedance $Z_{Bipolar}$.

According to one example embodiment of the inventive x-ray detector, the one stage in the activated state of the path has a bipolar pulse shaping unit. Thus in the activated state of the path, the first stage with an arrangement comprising a first impedance $Z_{Feedback}$ and second impedance $Z_{Bipolar}$ has an amplification and a bipolar pulse shaping.

The bipolar pulse shaping is enabled by the second impedance $Z_{Bipolar}$, which, advantageously, rapidly and easily contributes to the pulse shaping by activating the path with the aid of the switch. Bipolar pulse shaping is advantageous in the case of high photon fluxes. The use of bipolar pulse shaping can advantageously reduce the superimposition of a number of input signals, and faulty counts in respect of energy and number of photons can be advantageously avoided.

According to one example embodiment of the inventive x-ray detector, the one stage in the deactivated state of the path has a unipolar pulse shaping unit. In the deactivated state of the path, the second impedance thus has no effect or a minimal effect and the first stage acts as an amplifier and unipolar pulse shaper. In the deactivated state, preferably only the first impedance $Z_{Feedback}$ contributes to the pulse shaping and the one stage has an amplification and a unipolar pulse shaping. With an arrangement of the switch between the suitably selected tapping point of the first impedance $Z_{Feedback}$ and the second impedance $Z_{Bipolar}$, the second impedance $Z_{Bipolar}$ has no effect in the deactivated state. With an arrangement of the switch between the second impedance $Z_{Bipolar}$ and the ground or the supply voltage, the second impedance $Z_{Bipolar}$ has a minimal effect in the deactivated state. Unipolar pulse shaping can advantageously achieve better results in respect of noise and energy resolution.

According to the two afore-cited example embodiments of the invention, the one stage can have a unipolar pulse shaping or a bipolar pulse shaping as a function of activating or deactivating the path. Advantageously the pulse shaping can be selected as a function of the photon flux for instance. The switch advantageously enables a rapid and easy switchover between the unipolar pulse shaping and the bipolar pulse shaping. As a result, the pulse shaping can be advantageously adjusted to the respective application situation.

According to one example embodiment of the inventive x-ray detector, the first impedance $Z_{Feedback}$ or the second impedance $Z_{Bipolar}$ can be adjusted.

In order to adjust the pulse shape, the first impedance $Z_{Feedback}$ and the second impedance $Z_{Bipolar}$ can be adjustable or configurable. The pulse shape can be adjustable for instance in respect of the amplification, the pulse width or the undershoot. Advantageously the pulse shape can be varied. For instance, the amplification with unipolar pulse shaping can be advantageously aligned with the amplification with bipolar pulse shaping. The adjustability of the first impedance $Z_{Feedback}$ or the second impedance $Z_{Bipolar}$ permits the first impedance $Z_{Feedback}$ or the second impedance $Z_{Bipolar}$ to be adjusted differently for each pixel or channel so that differences between different manufacturing batches can be advantageously compensated and a uniform behavior of all pixels of channels can be advantageously achieved.

The design of the feedback network with the first impedance $Z_{Feedback}$ or the second impedance $Z_{Bipolar}$ combined with a one-stage amplifier and the selective use of the intrinsic pulse shaping can particularly efficiently fulfill all requirements that apply to a preamplifier of a direct-conversion counting x-ray detector.

According to one example embodiment of the inventive medical device, the medical device is a computed tomography system.

The various examination types which are performed with the aid of a computed tomography system require different parameters. A computed tomography system places high demands on the x-ray detector particularly in respect of the photon flux. To avoid an unwanted strong superimposition of individual signals and to achieve an optimal resolution, a switchable pulse shaping is desirable in order to adjust the x-ray detector to the photon flux. With the implementation of an analog front end, a minimal power loss is desirable on account of the high number of pixels of the x-ray detector. Operation of the evaluation electronics system or of the integrated circuit with a low supply voltage is advantageous. Fluctuations may occur between the channels of a chip or an x-ray detector and also due to the manufacturing process. The high number of channels or pixels which are used in the imaging with a computed tomography system advantageously achieves as similar a response behavior of the individual channels as possible. It is advantageous for the pulse shaping of the individual channels to be as similar as possible.

Figure 1:
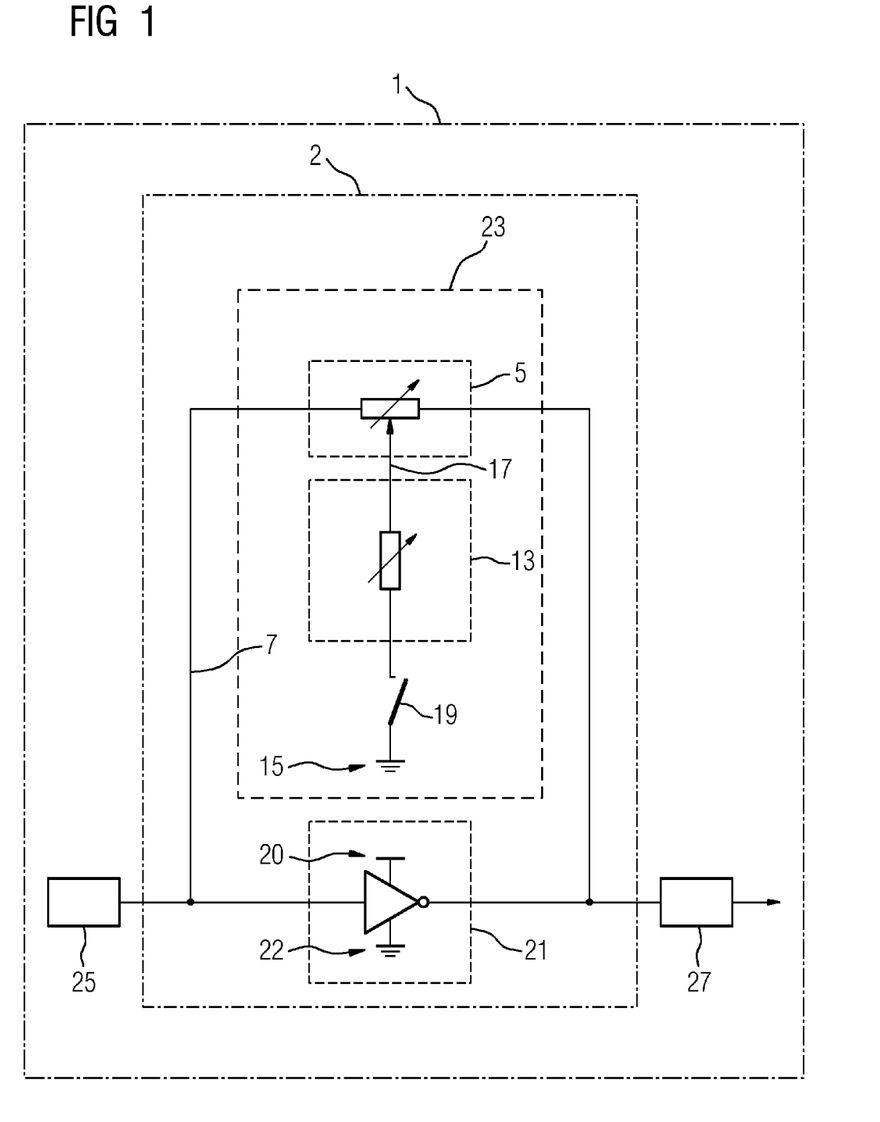
FIG. 1 shows a schematic representation of a concept of an inventive x-ray detector according to a first embodiment.

FIG. 1 shows an example design of a concept of an inventive x-ray detector 1 according to a first embodiment. The x-ray detector 1 comprises a sensor 25, which is connected to an evaluation electronics system, an integrated circuit or ASIC by way of solder connections for instance (not shown). The x-ray detector 1 has at least one pixel. In a preferred embodiment, the x-ray detector 1 has a two-dimensional matrix or arrangement of a plurality of pixels or subpixels. Each pixel or subpixel has the analog front end. The integrated circuit contains an analog front end and a digital front end (not shown). The pulse from the sensor 25 is firstly amplified and shaped in the one stage 2 in the analog front end and then forwarded to an analog/digital converter 27. The one stage 2 consists of a preamplifier 21 and a feedback network 23. The preamplifier 21 is a transimpedance amplifier which can amplify the current pulse. The amplification is dependent on the first impedance $Z_{Feedback}$ 5. Furthermore, the peak height of the pulse is proportional to the pulse shaping time. The pulse shaping time may be less than 50 ns and the incoming signal may have a length of 20 ns for instance. There is a positive supply voltage 20 and a negative supply voltage 22 or ground on the preamplifier 21. The feedback network 23 has a feedback path 7 which is disposed between the amplifier input and amplifier output. The feedback path 7 has the first impedance $Z_{Feedback}$ 5. A path 17 between ground 15 or supply voltage and a suitably selected tapping point of the first impedance $Z_{Feedback}$ 5 has the second impedance $Z_{Bipolar}$ 13. The path 17 has a final impedance. The path 17 has a switch 19 for activating and deactivating the path 17. The switch 19 can be arranged here between the second impedance $Z_{Bipolar}$ 13 and the ground 15 or the supply voltage. With an arrangement of the switch 19 between the second impedance $Z_{Bipolar}$ 13 and the ground 15 or the supply voltage, the second impedance $Z_{Bipolar}$ 13 has a minimal effect in the deactivated state. As a function of activating or deactivating the path 17, the one stage 2 can have a unipolar pulse shaping or a bipolar pulse shaping.

Figure 2:
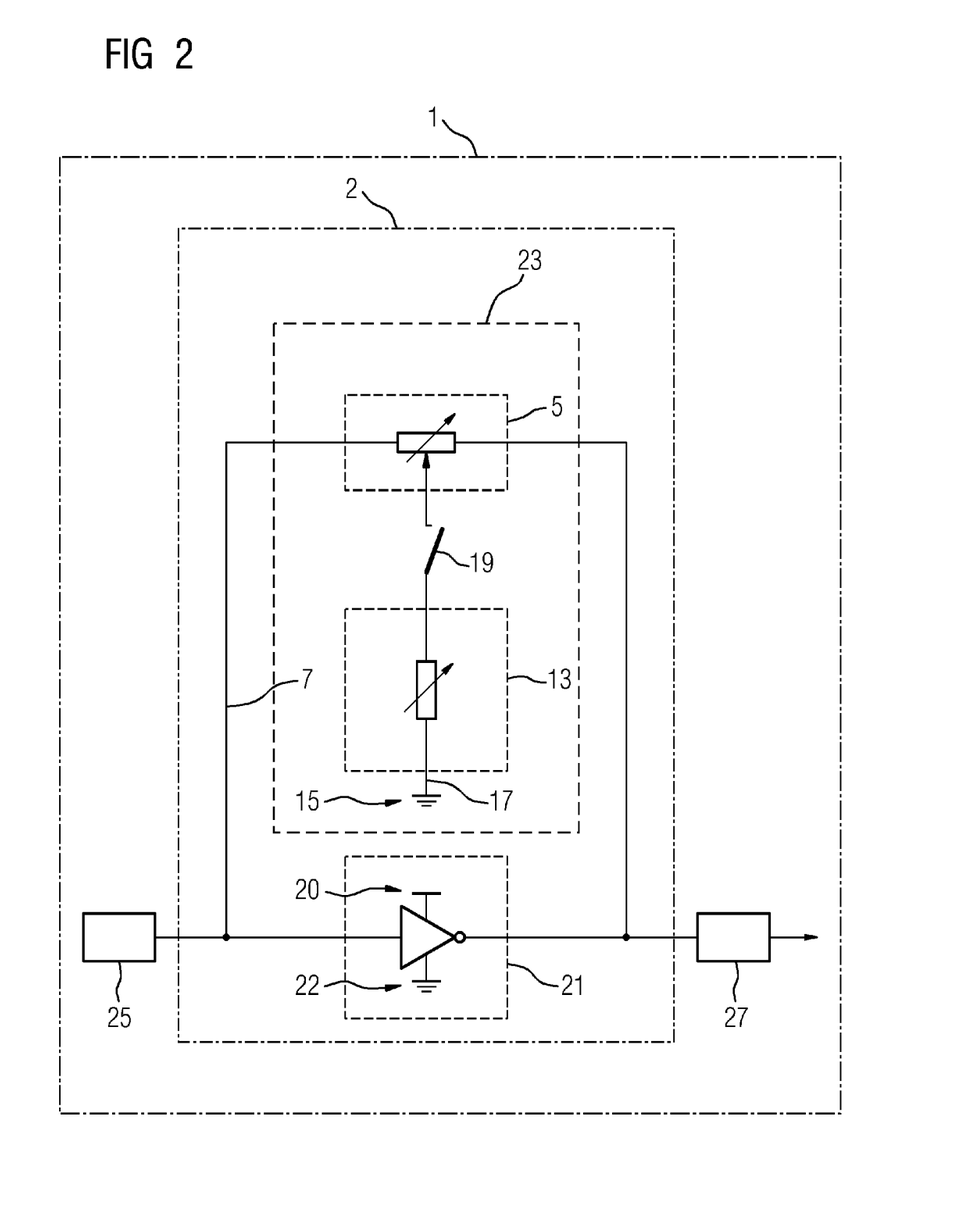
FIG. 2 shows a schematic representation of a concept of an inventive x-ray detector according to a second embodiment.

FIG. 2 shows an example design of a concept of an inventive x-ray detector 1 according to a second embodiment with an alternative arrangement of the switch 19 in the analog front end. The switch 19 can be arranged here between the suitably selected tapping point of the first impedance $Z_{Feedback}$ 5 and the second impedance $Z_{Bipolar}$ 13. With an arrangement of the switch 19 between the suitably selected tapping point of the first impedance $Z_{Feedback}$ 5 and the second impedance $Z_{Bipolar}$ 13, the second impedance $Z_{Bipolar}$ 13 has no effect in the deactivated state.

Figure 3:
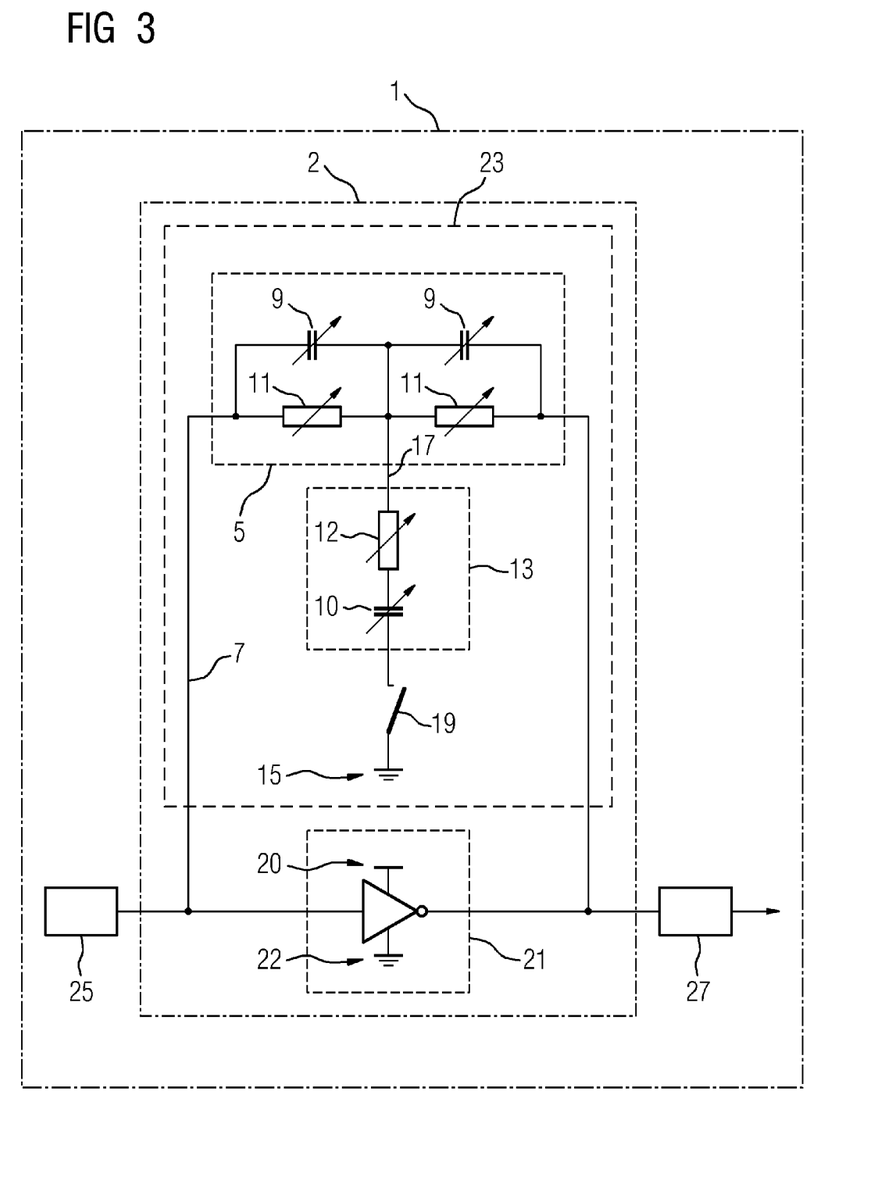
FIG. 3 shows a schematic representation of a concept of an inventive x-ray detector according to development of the first embodiment.

FIG. 3 shows an example design of a concept of an inventive x-ray detector 1 according to a development of the first embodiment. An example design of an implementation of the first impedance $Z_{Feedback}$ 5 and the second impedance $Z_{Bipolar}$ 13 is described as a development of the example design of a concept of an inventive x-ray detector 1 described in FIG. 1. The first impedance $Z_{Feedback}$ 5 can be embodied by a capacitor 9 with a parallel-connected resistor 11. The parallel-connected resistor is designed to be low-resistance here in order to enable a sufficiently rapid discharge process of the capacitor and thus to enable a generation of a unipolar pulse. The parallel-connected resistor can be configured between 100 kΩ and 900 kΩ, wherein the capacitative branch can have a capacitance of 10 fF to 20 fF. In addition to the first impedance $Z_{Feedback}$ 5, the second impedance $Z_{Bipolar}$ 13 is disposed at a suitably selected tapping point of the first impedance $Z_{Feedback}$ 5. The second impedance $Z_{Bipolar}$ 13 is on a path 17 which can be activated and deactivated by a switch 19. The switch 19 is arranged here between the second impedance $Z_{Bipolar}$ 13 and the ground 15 or the supply voltage. With an arrangement of the switch 19 between the second impedance $Z_{Bipolar}$ 13 and the ground 15 or the supply voltage, the second impedance $Z_{Bipolar}$ 13 has a minimal effect in the deactivated state. The switch 19 can alternatively be arranged between the suitably selected tapping point of the first impedance $Z_{Feedback}$ 5 and the second impedance $Z_{Bipolar}$ 13 (not shown). With an arrangement of the switch 19 between the suitably selected tapping point of the first impedance $Z_{Feedback}$ 5 and the second impedance $Z_{Bipolar}$ 13 (not shown), the second impedance $Z_{Bipolar}$ 13 has no effect in the deactivated state. The second impedance $Z_{Bipolar}$ 13 can be embodied as a capacitor 10 and resistor 12 which are connected in series. The second impedance $Z_{Bipolar}$ 13 is final in the activated state of the path 17. By means of a capacitive part, a high-pass characteristic is added to the transfer function of the preamplifier 21 and as a result of this a bipolar pulse shaping is enabled. The first impedance $Z_{Feedback}$ 5 and the second impedance $Z_{Bipolar}$ 13 can be configured, varied or adjusted so that the pulse shape can be adjusted in terms of amplification, pulse width and undershoot for instance.

Figure 4:
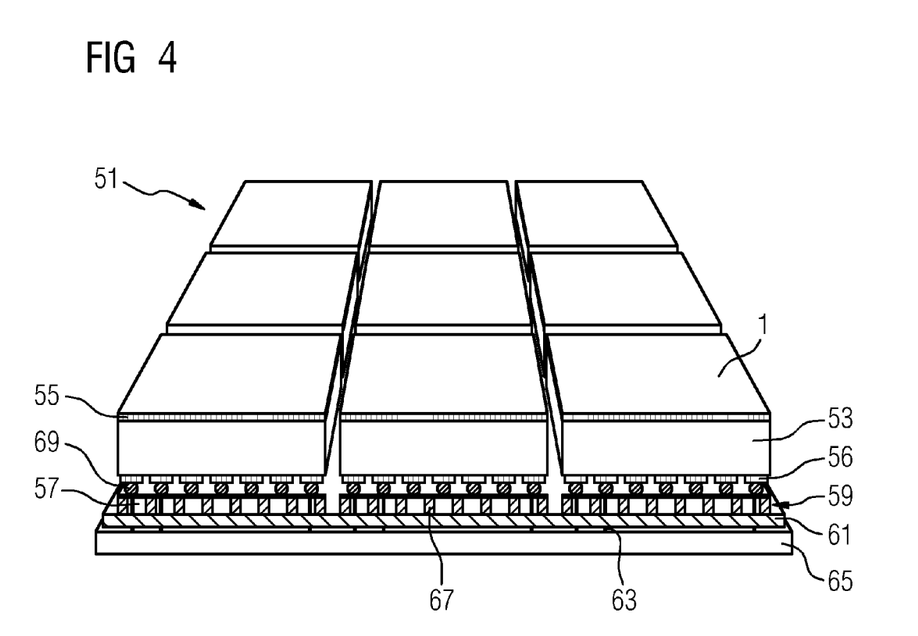
FIG. 4 shows a schematic representation of a detector module with an arrangement of inventive x-ray detectors.

FIG. 4 shows an example design of a detector module 51 with an arrangement of inventive x-ray detectors 1. In a preferred embodiment, the x-ray detector 1 has a two-dimensional matrix or arrangement of a plurality of pixels or subpixels. The number of subpixels may be in the range of 100 to several thousand for instance. The x-ray detector 1 has a sensor 53. The sensor 53 can be embodied as a planar direct converter, for instance having CdTe, CZT, CdZnTeSe, CdTeSe, CdMnTe, InP, $TlBr_2$, $HgI_2$, GaAs or other materials as converter material. The top side of the sensor 53 has a top electrode 55. The bottom side of the sensor 53 has a two-dimensional arrangement of contacts 56. The contacts 56 are connected via solder connections 69 to the pixel electrodes 57 and the pixel electronics systems 67 in the ASIC 59. The solder connections 69 can be embodied for instance as bump bonds or solder material in conjunction with copper pillars for instance. The number of contacts 56, the number of solder connections 69, the number of pixel electrodes 57 and the number of pixel electronics systems 67 in the ASIC 59 are the same. The electrical field between the top electrode 55 and a contact 56 determines a sensitive detection volume. The unit comprising a detection volume, a contact 56, a solder connection 69, a pixel electrode 57 and a pixel electronics system 67 connected to the pixel electrode 57 forms a pixel or subpixel. The analog front end comprising the one stage 2 is disposed in each pixel electronics system 67. Each subpixel has the analog front end. The signals of a number of subpixels, for instance within a macro pixel, can be combined by way of further circuits, particularly in the digital front end. The ASIC 59 is connected on the bottom side to a substrate 61. The ASIC 59 is connected via TSV connections 63 through the substrate 61 to a peripheral electronics system 65.

Figure 5:
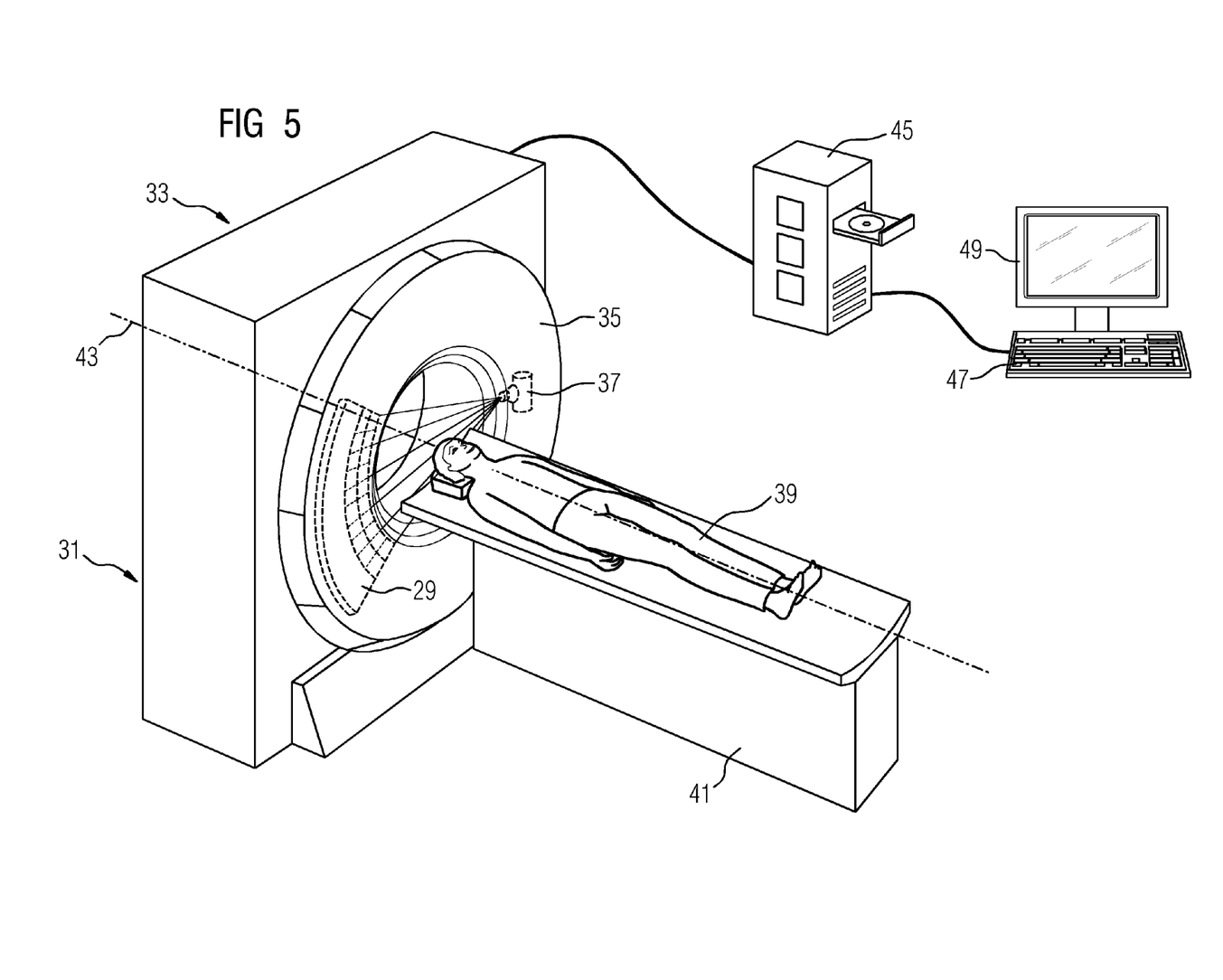
FIG. 5 shows a schematic representation of an inventive computed tomography system.

FIG. 5 shows an example design of an inventive computed tomography system 31 with an inventive detector apparatus 29. The detector apparatus 29 has the inventive x-ray detector 1. The detector apparatus 29 may have a number of detector modules 51 which have at least one x-ray detector 1. The detector modules 51 preferably have a plurality of x-ray detectors 1 in a two-dimensional matrix or arrangement. The computed tomography system 31 contains a gantry 33 with a rotor 35. The rotor 35 comprises an x-ray source 37 and the inventive detector apparatus 29. The patient 39 is supported on the patient couch 41 and can be moved along the axis of rotation z 43 through the gantry 33. A computing unit 45 is used to control and calculate the cross-sectional images. An input facility 47 and an output apparatus 49 are connected to the computing unit 45.

Although the invention has been illustrated in greater detail by the preferred example embodiment, the invention is not limited by the examples disclosed and the person skilled in the art will be able to derive other variations on this basis without departing from the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A direct-conversion counting x-ray detector comprising:
an analog front end that includes one single stage that performs both preamplification and pulse shaping via a single preamplifier and a pulse shaping unit, the pulse shaping unit including a path having a switch and the switch is configured to activate or deactivate the path to switch between unipolar and bipolar shaping.

2. The x-ray detector of claim 1, wherein the one stage includes a feedback path.

3. The x-ray detector of claim 2, wherein the feedback path includes a first impedance $Z_{Feedback}$ and wherein an amplification of an input signal and a pulse shaping is dependent on the first impedance $Z_{Feedback}$.

4. The x-ray detector of claim 2, wherein the one single stage includes a capacitor with a parallel-connected resistor.

5. The x-ray detector of claim 4, wherein the parallel-connected resistor is low-resistance.

6. The x-ray detector of claim 2, wherein the path is between the first impedance $Z_{Feedback}$ and a ground or a supply voltage, and wherein the path includes a second impedance $Z_{Bipolar}$ between the first impedance and the ground or the supply voltage.

7. The x-ray detector of claim 1, wherein in the activated state of the path the one single stage includes a bipolar pulse shaping unit.

8. The x-ray detector of claim 1, wherein in the deactivated state of the path, the one single stage includes a unipolar pulse shaping unit.

9. The x-ray detector of claim 3, wherein the first impedance $Z_{Feedback}$ is adjustable.

10. A medical device comprising:
the x-ray detector of claim 1.

11. The medical device of claim 10, wherein the medical device is a computed tomography system.

12. The x-ray detector of claim 3, wherein the one single stage includes a capacitor with a parallel-connected resistor.

13. The x-ray detector of claim 12, wherein the parallel-connected resistor is low-resistance.

14. The x-ray detector of claim 3, wherein the one single stage includes a path between the first impedance $Z_{Feedback}$ and a ground or a supply voltage, and wherein the path includes a second impedance $Z_{Bipolar}$ between the first impedance and the ground or the supply voltage.

15. The x-ray detector of claim 6, wherein the first impedance $Z_{Feedback}$ or the second impedance $Z_{Bipolar}$ is adjustable.

16. A medical device comprising:
the x-ray detector of claim 2.

17. The medical device of claim 16, wherein the medical device is a computed tomography system.

18. A medical device comprising:
the x-ray detector of claim 3.

19. The medical device of claim 18, wherein the medical device is a computed tomography system.

20. A medical device comprising:
the x-ray detector of claim 6.

21. The medical device of claim 20, wherein the medical device is a computed tomography system.

* * * * *